(12) United States Patent
Moriya

(10) Patent No.: US 11,981,595 B2
(45) Date of Patent: May 14, 2024

(54) BURNER FOR PRODUCING GLASS FINE PARTICLE DEPOSITED BODY, AND DEVICE AND METHOD FOR PRODUCING GLASS FINE PARTICLE DEPOSITED BODY

(71) Applicant: SUMITOMO ELECTRIC INDUSTRIES, LTD., Osaka (JP)

(72) Inventor: Tomomi Moriya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 319 days.

(21) Appl. No.: 17/298,820

(22) PCT Filed: Dec. 4, 2019

(86) PCT No.: PCT/JP2019/047455
§ 371 (c)(1),
(2) Date: Jun. 1, 2021

(87) PCT Pub. No.: WO2020/116521
PCT Pub. Date: Jun. 11, 2020

(65) Prior Publication Data
US 2022/0017403 A1   Jan. 20, 2022

(30) Foreign Application Priority Data
Dec. 4, 2018   (JP) .................................. 2018-227117

(51) Int. Cl.
*C03B 37/014*   (2006.01)
(52) U.S. Cl.
CPC ...... *C03B 37/0142* (2013.01); *C03B 2207/12* (2013.01); *C03B 2207/32* (2013.01); *C03B 2207/52* (2013.01)

(58) Field of Classification Search
CPC ...................... C03B 37/0142; C03B 2207/40
See application file for complete search history.

(56) References Cited

U.S. PATENT DOCUMENTS

2003/0029202 A1*  2/2003  Ooishi .............. C03B 37/01406
65/531
2004/0060326 A1   4/2004  Ishihara
(Continued)

FOREIGN PATENT DOCUMENTS

| JP | 63222034 A * | 9/1988 | ....... C03B 37/01413 |
| JP | H10-053430 A | 2/1998 | |

(Continued)

OTHER PUBLICATIONS

JP-2000064237-A Clarivate Analytics Machine Translation Retreived Jun. 12, 2023. (Year: 2023).*
(Continued)

*Primary Examiner* — Lisa L Herring
(74) *Attorney, Agent, or Firm* — Faegre Drinker Biddle & Reath LLP

(57) ABSTRACT

This burner for producing a fine glass particle deposited body is provided with a metallic gas-feed pipe that forms a burner body, and a cover for covering the gas-feed pipe, wherein: the gas-feed pipe and the cover are integrally formed; the gas-feed pipe has connected thereto a piping through which material gas, oxyhydrogen gas, and seal gas are supplied; and the cover covers, in the axial direction of the burner over a prescribed length and in a given constant outer diameter, the gas-feed pipe and a connection part of the piping connected to a lateral surface of the gas-feed pipe.

1 Claim, 3 Drawing Sheets

(56) References Cited

U.S. PATENT DOCUMENTS

2006/0117800 A1 6/2006 Kume et al.
2014/0338400 A1* 11/2014 Yamazaki ........... C03B 19/1423
65/421

FOREIGN PATENT DOCUMENTS

| JP | 2000044276 A | * | 2/2000 | ....... C03B 37/01413 |
|----|----|----|----|----|
| JP | 2000064237 A | * | 2/2000 | |
| JP | 2005-029448 A | | 2/2005 | |
| JP | 2012-062203 A | | 3/2012 | |
| JP | 2012-166992 A | | 9/2012 | |
| JP | 2013-241288 A | | 12/2013 | |
| JP | 2014-224007 A | | 12/2014 | |
| WO | WO-02-102729 A1 | | 12/2002 | |

OTHER PUBLICATIONS

JP-2000044276-A Clarivate Analytics Machine Translation Retreived Jun. 12, 2023 (Year: 2023).*
JP-63222034-A EPO Machine Translation Performed Oct. 11, 2023. (Year: 2023).*

* cited by examiner

BURNER FOR PRODUCING GLASS FINE PARTICLE DEPOSITED BODY, AND DEVICE AND METHOD FOR PRODUCING GLASS FINE PARTICLE DEPOSITED BODY

TECHNICAL FIELD

The present disclosure relates to a burner for producing a glass fine particle deposited body, a device for producing the glass fine particle deposited body, and a method therefor. This application is based upon and claims the benefit of priority from Japanese Patent Application No. 2018-227117, filed on Dec. 4, 2018, the entire contents of which are incorporated herein by reference.

BACKGROUND ART

Patent Literature 1 describes a burner for producing a glass fine particle deposited body that forms the glass fine particle deposited body by using siloxane as a raw material and a method for producing the glass fine particle deposited body.

Patent Literature 2 describes a burner that retracts as the glass fine particle deposited body grows and of which a diameter increases.

CITATION LIST

Patent Literature

Patent Literature 1: JP-A-2014-224007
Patent Literature 2: JP-A-2012-62203

SUMMARY OF INVENTION

According to one aspect of the present disclosure, a burner for producing a glass fine particle deposited body includes:
a gas supply pipe which is made of metal and forms a main body of the burner; and
a cover that covers the gas supply pipe, wherein
the gas supply pipe and the cover are configured to be integrated,
a pipe for supplying raw material gas, oxyhydrogen gas, and seal gas is connected to the gas supply pipe, and
the cover covers the gas supply pipe and a connection portion of the pipe connected to a side surface of the gas supply pipe with a predetermined length in an axial direction of the burner and a given constant outer diameter.

According to one aspect of the present disclosure, a device for producing a glass fine particle deposited body, which produces the glass fine particle deposited body by depositing a glass fine particle on a starting rod disposed inside a reaction vessel, includes:
a wall portion that is disposed to be separated from the starting rod and includes a through hole through which a burner passes on a wall surface;
a clean air supply portion that supplies clean air from an outside of the wall portion to an inside thereof;
the burner including a metallic gas supply pipe which is a main body of the burner, and a cover that covers the gas supply pipe and is formed to be integrated with the gas supply pipe; and
a moving mechanism that retracts the burner as the glass fine particle deposited body grows, where
a pipe for supplying raw material gas, oxyhydrogen gas, and seal gas is connected to the gas supply pipe of the burner, and
the cover covers the gas supply pipe and a connection portion of the pipe connected to a side surface of the gas supply pipe with a predetermined length in an axial direction of the burner and a given constant outer diameter.

According to one aspect of the present disclosure, there is a method for producing a glass fine particle deposited body, which produces the glass fine particle deposited body by depositing a glass fine particle on a starting rod disposed inside a reaction vessel, the method including:
providing a through hole through which a burner passes on a wall surface of a wall portion disposed to be separated from the starting rod, the burner being provided with a metallic gas supply pipe as a main body of the burner and a cover that covers the gas supply pipe in an integrated manner, a pipe for supplying raw material gas, oxyhydrogen gas, and seal gas to the gas supply pipe being connected to the gas supply pipe, the cover covering the gas supply pipe and a connection portion of the pipe connected to a side surface of the gas supply pipe with a predetermined length in an axial direction of the burner and a given constant outer diameter;
retracting the burner while keeping a gap with the through hole a given constant length as the glass fine particle deposited body grows; and
introducing clean air into the reaction vessel through the gap.

DESCRIPTION OF EMBODIMENTS

Technical Problem

Figure 1:
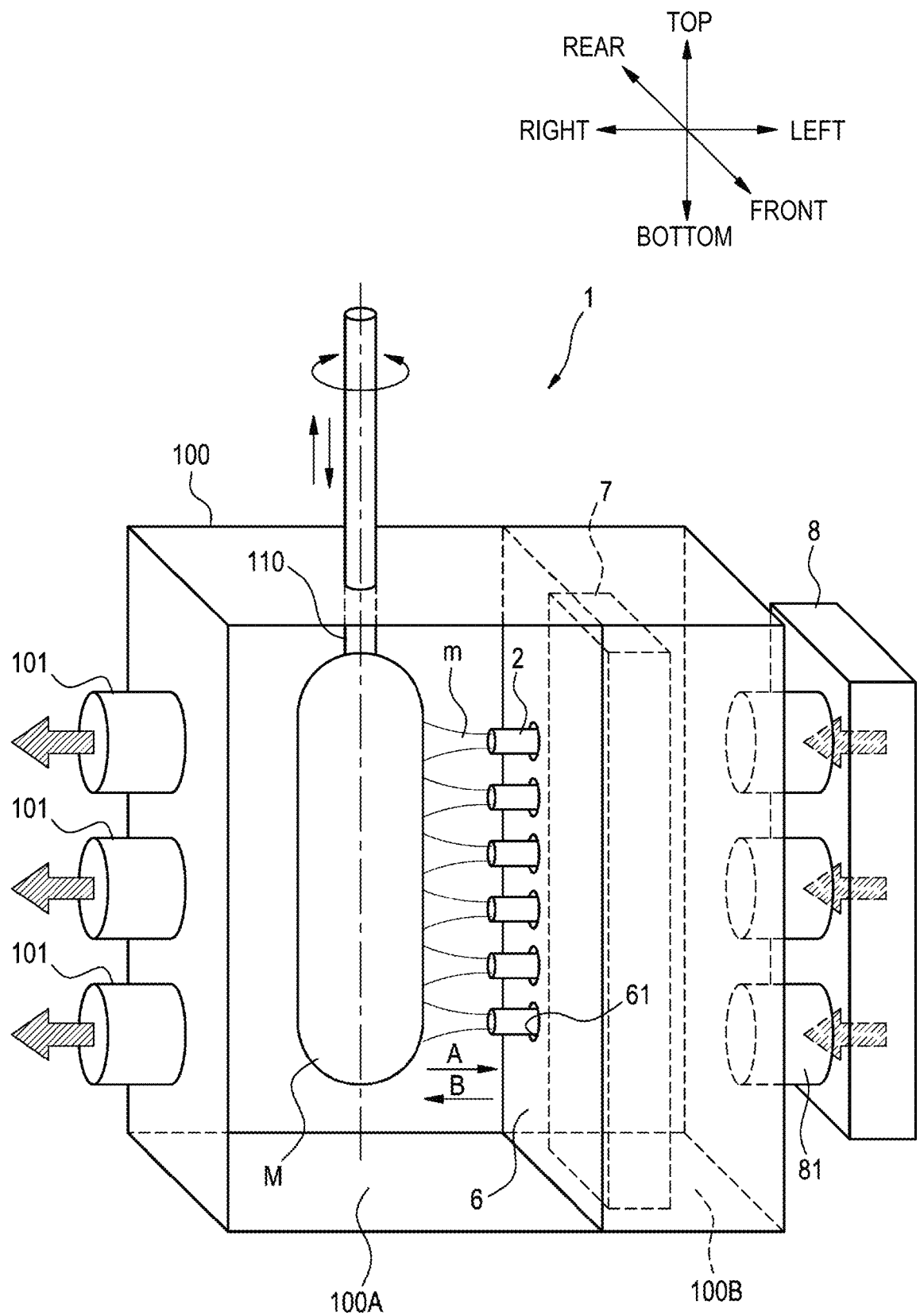
FIG. 1 is a schematic configuration diagram of a device for producing a glass fine particle deposited body according to an embodiment of the present disclosure.

In an outside vapor deposition (OVD) method and a multi-burner multilayer deposition (MMD) method, clean air is introduced into a reaction vessel and then exhausted through an exhaust port provided at an opposite position, such that a glass fine particle or the like that are not deposited on a glass fine particle deposited body (hereinafter referred to as surplus soot) are exhausted, flame is adjusted, and the glass fine particle is stably deposited. Here, when the glass fine particle deposited body grows and a diameter thereof becomes large, a distance between a burner and a deposition surface changes and temperature of the deposit surface and deposition efficiency may change. Therefore, the burner needs to be retracted as the diameter of the glass fine particle deposited body increases.

When the glass fine particle deposited body is formed by using siloxane as a raw material, it is preferable to provide a gap between the burner and a wall surface around a periphery of the burner to flow clean air through the gap so that a stable air flow of the clean air can be generated around the periphery of the burner.

Siloxane has a high boiling point and thus is required to heat Siloxane at a high temperature, and when a quartz burner used in a process where silicon tetrachloride is used as a raw material is used, it is difficult to select a material to be used for connection with a pipe. Therefore, when siloxane is used, a metallic burner is used. When a long metallic burner with an outer diameter accuracy such as the quartz burner is produced, it becomes very expensive. Therefore, a length of a fixed diameter portion is shortened. Because of the length, it is difficult to secure a stroke for the burner to be retracted only with the fixed diameter portion, and a portion of the burner where the pipe is connected other than the fixed diameter portion are also required to pass through the wall.

Therefore, as the glass fine particle deposited body grows (the burner is retracted), a cross-sectional area of the gap through which the clean air passes changes, a flow velocity of the clean air changes. When the flow velocity of the clean air changes and the air flow is not stable, a deposition state of the glass fine particles is affected. For example, in order to stabilize deposition efficiency, temperature of a deposition surface needs to be kept within a certain range, but when the cross-sectional area of the gap changes during the deposition, the temperature of the deposition surface may not be stable.

An object of the present disclosure is to provide a burner for producing a glass fine particle deposited body, a device for producing the glass fine particle deposited body, and a method therefor in which temperature of a deposition surface of the glass fine particle deposited body can be stabilized during a producing process, and excess soot in a reaction vessel can be removed by efficiently performing exhaust.

Advantageous Effects of the Present Disclosure

According to a burner for producing a glass fine particle deposited body, a device for producing the glass fine particle deposited body, and a method therefor, temperature of a deposition surface of the glass fine particle deposited body can be stabilized during a producing process, and excess soot in a reaction vessel can be removed by efficiently performing exhaust.

DESCRIPTION OF EMBODIMENTS OF THE PRESENT DISCLOSURE

First, embodiments of the present disclosure will be listed and described.

(1) According to one aspect of the present disclosure, there is a burner for producing a glass fine particle deposited body, the burner including:
  a metallic gas supply pipe which is a main body of the burner; and
  a cover that covers the gas supply pipe, where
  the gas supply pipe and the cover are configured to be integrated,
  a pipe for supplying raw material gas, oxyhydrogen gas, and seal gas is connected to the gas supply pipe, and
  the cover covers the gas supply pipe and a connection portion of the pipe connected to a side surface of the gas supply pipe with a predetermined length in an axial direction of the burner and a given constant outer diameter.

According to the above-described configuration, the cover covers the gas supply pipe and the connection portion of the pipe connected to the side surface of the gas supply pipe with the predetermined length in the axial direction of the burner and the given constant outer diameter. Therefore, even though the burner is mounted on one side wall surface disposed to be separated from the glass fine particle deposited body in a reaction vessel and the burner is retracted when the glass fine particle deposited body is produced, a cross-sectional area of a gap between the wall surfaces can be made a given constant area. Since clean air can be introduced through the given gap during a producing process by producing the glass fine particle deposited body using the burner having the above-described configuration, temperature of a deposition surface of the glass fine particle deposited body can be stabilized, and exhaust can be efficiently performed to remove excess soot in the reaction vessel.

(2) According to one aspect of the present disclosure, there is a device for producing a glass fine particle deposited body, which produces the glass fine particle deposited body by depositing a glass fine particle on a starting rod disposed inside a reaction vessel, the device including:
  a wall portion that is disposed to be separated from the starting rod and includes a through hole through which a burner passes on a wall surface;
  a clean air supply portion that supplies clean air from an outside of the wall portion to an inside thereof;
  the burner including a metallic gas supply pipe which is a main body of the burner, and a cover that covers the gas supply pipe and is formed to be integrated with the gas supply pipe; and
  a moving mechanism that retracts the burner as the glass fine particle deposited body grows, where
  a pipe for supplying raw material gas, oxyhydrogen gas, and seal gas is connected to the gas supply pipe of the burner, and
  the cover covers the gas supply pipe and a connection portion of the pipe connected to a side surface of the gas supply pipe with a predetermined length in an axial direction of the burner and a given constant outer diameter.

According to the above-described configuration, in the burner mounted by passing through a gap between the wall surface of the wall portion disposed to be separated from the starting rod and the cover, the cover covers the gas supply pipe and the connection portion of the pipe connected to the side surface of the gas supply pipe with the predetermined length in the axial direction of the burner and the given constant outer diameter. Therefore, even though the burner is retracted when the glass fine particle deposited body is produced, a cross-sectional area of the gap between the wall surfaces can be made a given constant area. As a result, since clean air can be introduced through the given gap during a producing process, temperature of a deposition surface of the glass fine particle deposited body can be stabilized, and exhaust can be efficiently performed to remove excess soot in the reaction vessel.

(3) According to one aspect of the present disclosure, there is a method for producing a glass fine particle deposited body, which produces the glass fine particle deposited body by depositing a glass fine particle on a starting rod disposed inside a reaction vessel, the method including:
  providing a through hole through which a burner passes on a wall surface of a wall portion disposed to be separated from the starting rod, the burner being provided with a metallic gas supply pipe as a main body of the burner and a cover that covers the gas supply pipe in an integrated manner, a pipe for supplying raw material gas, oxyhydrogen gas, and seal gas to the gas supply pipe being connected to the gas supply pipe, the cover covering the gas supply pipe and a connection portion of the pipe connected to a side surface of the gas supply pipe with a predetermined length in an axial direction of the burner and a given constant outer diameter;

retracting the burner while keeping a gap with the through hole a given constant length as the glass fine particle deposited body grows; and introducing clean air into the reaction vessel through the gap.

According to the above-described method, in the burner mounted by passing through the gap between the wall surface of the wall portion disposed to be separated from the starting rod and the cover, the cover covers the gas supply pipe and the connection portion of the pipe connected to the side surface of the gas supply pipe with the predetermined length in the axial direction of the burner and the given constant outer diameter. Therefore, even though the burner is retracted when the glass fine particle deposited body is produced, a cross-sectional area of the gap between the wall surfaces can be made a given constant area. As a result, since clean air can be introduced through the given gap during a producing process, temperature of a deposition surface of the glass fine particle deposited body can be stabilized, and exhaust can be efficiently performed to remove excess soot in the reaction vessel.

(4) The method for producing the glass fine particle deposited body according to (3), where octamethylcyclotetrasiloxane (OMCTS) may be used as a raw material and the gas supply pipe may be heated to 230° C. or higher.

When OMCTS is used as the raw material, the gas supply pipe is heated to 230° C. or higher, which is higher than boiling point temperature of OMCTS, such that it is possible to prevent OMCTS from liquefying in the gas supply pipe, that is, in the burner.

Details of Embodiments of the Present Disclosure

A specific example of a burner for producing a glass fine particle deposited body, a device for producing the glass fine particle deposited body, and a method therefor according to an embodiment of the present disclosure will be described with reference to the drawings.

The present invention is not limited to the examples, but is indicated by the scope of the claims, and is intended to include all the modifications within the meaning equivalent to the scope of the claims and within the scope thereof.

FIG. 1 is a schematic configuration diagram illustrating an example of a device for producing a glass fine particle deposited body according to an embodiment of the present disclosure.

As illustrated in FIG. 1, a device for producing a glass fine particle deposited body 1 (hereinafter referred to as a producing device 1) is a device for producing a glass fine particle deposited body M by depositing a glass fine particle m on a starting rod 110 disposed in a reaction vessel 100. The producing device 1 includes: a burner 2 that sprays the glass fine particle m toward the starting rod 110; a wall portion 6 through which the burner 2 is inserted; a moving mechanism 7 that moves the burner 2; and a clean air supply portion 8 that supplies clean air.

A through hole is provided on an upper wall of the reaction vessel 100, and the starting rod 110 is disposed to be inserted through the through hole in a vertical direction. An upper end of the starting rod 110 is gripped by a rotary traverse device (not illustrated), thereby rotating in the reaction vessel 100 and reciprocating in the vertical direction.

The burner 2 is disposed on one side portion (a left side portion) of the reaction vessel 100, an exhaust pipe 101 is connected to a side portion (a right side portion) thereof on a side opposite to the burner 2, and the starting rod 110 is interposed therebetween. The exhaust pipe 101 is a pipe that exhausts a predetermined amount of gas, and removes the glass fine particle m, which is not deposited on the glass fine particle deposited body M and floats in the reaction vessel 100, to the outside.

The burner 2 is inserted through the wall portion 6 that partitions the inside of the reaction vessel 100 into two chambers, and is provided so that a spraying surface of the burner 2 faces the starting rod 110. A plurality of burners 2 (six in the present example) are provided to be arranged side by side at an equal gap in an axial direction (the vertical direction) of the starting rod 110. Each burner 2 is configured to be able to independently spray the glass fine particle m toward the starting rod 110.

The wall portion 6 is formed at a position separated from the starting rod 110. The inside of the reaction vessel 100 is partitioned, by the wall portion 6, into a reaction chamber 100A (a chamber on the right side) where the glass fine particle m is sprayed and a clean air chamber 100B (a chamber on the left side) into which clean air flows. A through hole 61 is provided on a wall surface of the wall portion 6 to allow the two left and right chambers of the reaction vessel 100 to communicate with each other. A plurality of through holes 61 (six in the present example) are provided to be arranged side by side at an equal space in the axial direction of the starting rod 110. Each burners 2 are inserted into the corresponding through holes 61. A diameter R1 of the through hole 61 is formed to be, for example, about 70 to 80 mm.

The moving mechanism 7 is a mechanism capable of supporting the burner 2 in a state of being inserted into the through hole 61, and moving the burner 2 backward (in a direction of an arrow A) or forward (in a direction of an arrow B) with respect to the starting rod 110 in the reaction vessel 100. The moving mechanism 7 is provided in, for example, the clean air chamber 100B. The moving mechanism 7 includes a driving portion formed of, for example, a linear motor, a stepping motor, or the like capable of moving the burner 2 linearly.

As such, the producing device 1 of this example produces the glass fine particle deposited body M with an MMD method in which the plurality of burners 2 allow the glass fine particle m to be deposited on the starting rod 110 while relatively moving with respect to the starting rod 110.

The clean air supply portion 8 is a device for supplying clean air, which is cleaning gas, into the reaction vessel 100. The clean air supply portion 8 is connected to the clean air chamber 100B via an air supply pipe 81.

Figure 2:
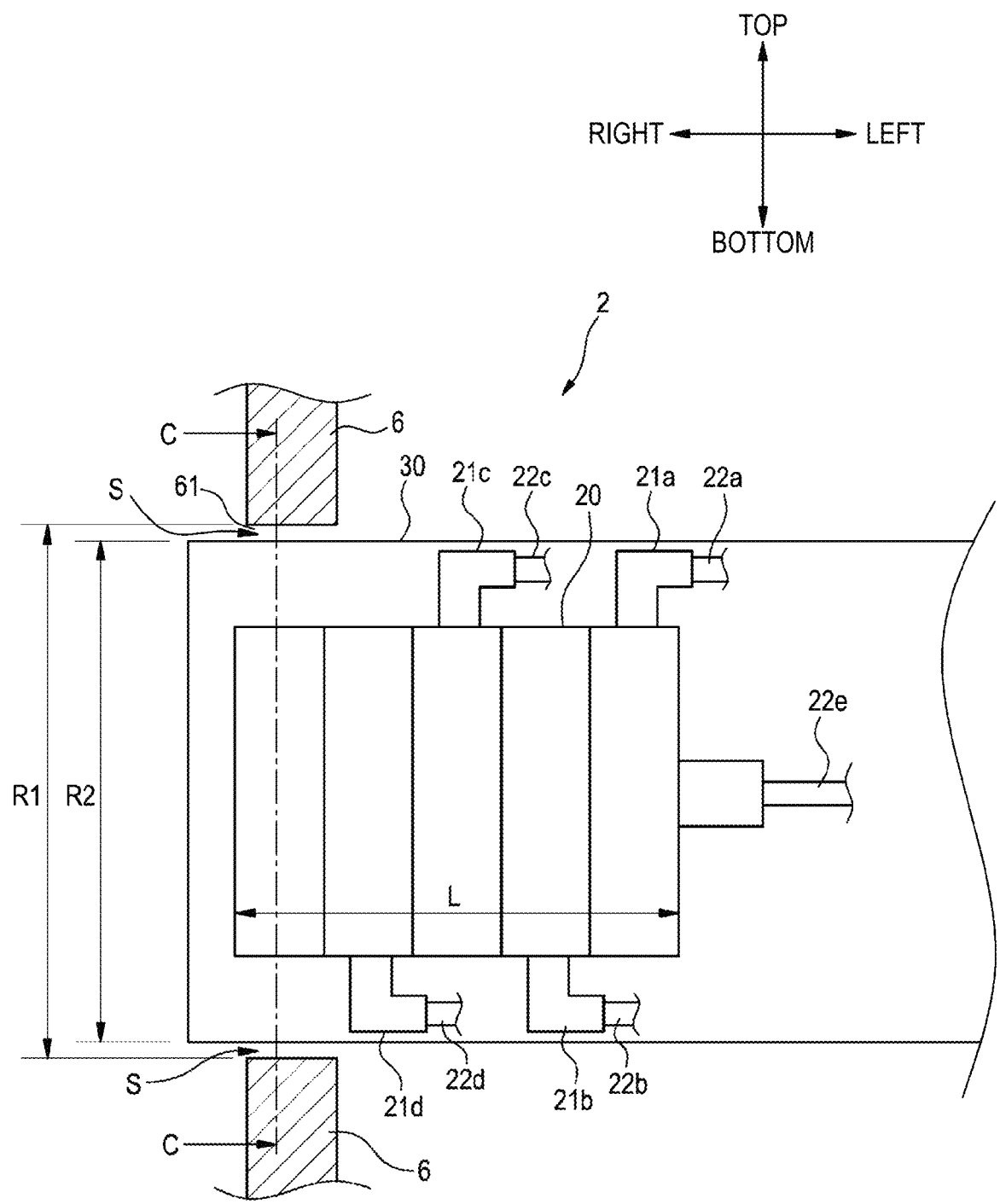
FIG. 2 is a schematic configuration diagram of a burner for producing the glass fine particle deposited body according to the embodiment of the present disclosure.
Figure 3:
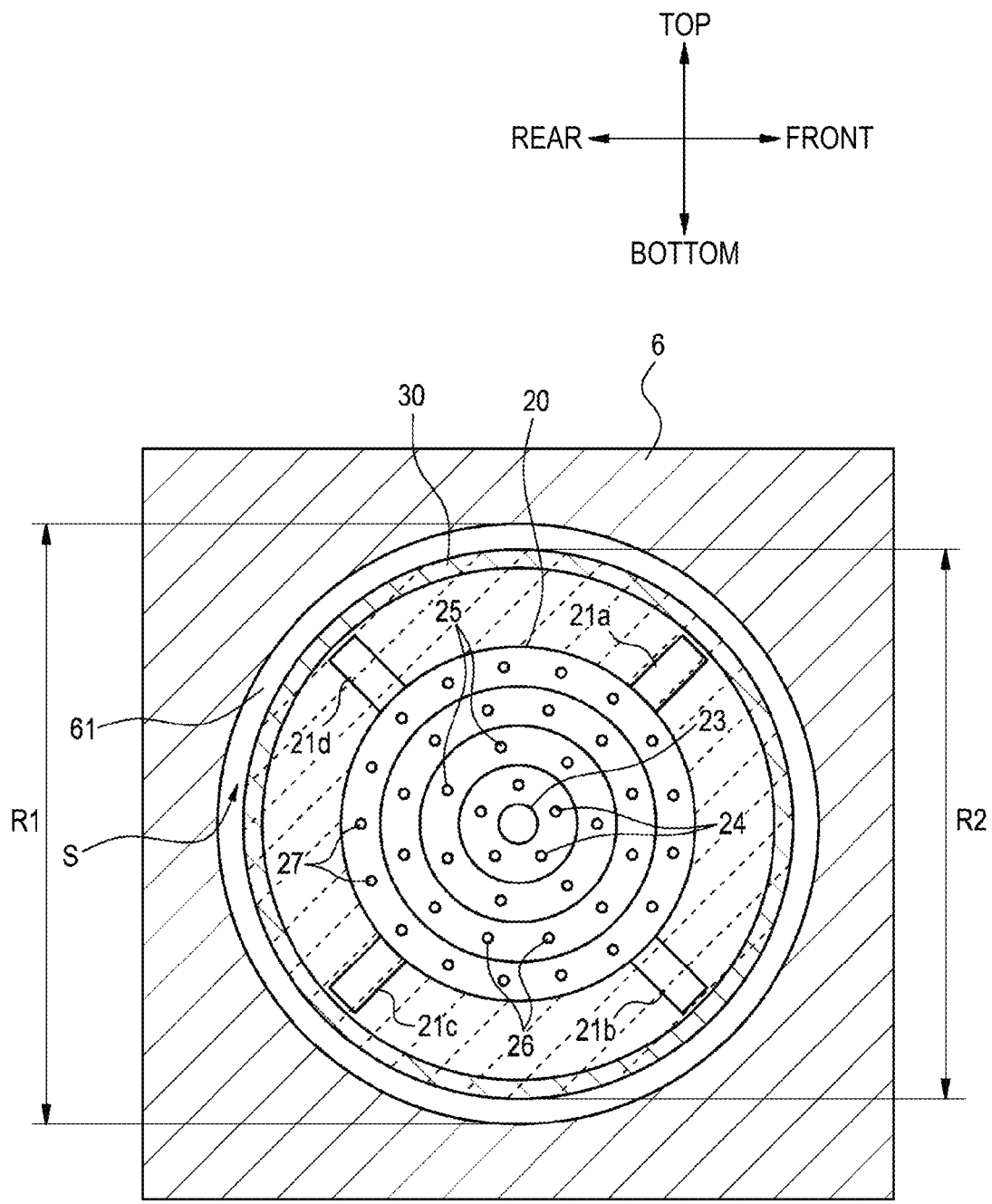
FIG. 3 is a cross-sectional view taken along an arrow line C-C of FIG. 2.

FIG. 2 is a schematic configuration diagram of the burner 2 observed from the side surface side. FIG. 3 is a cross-sectional view taken along an arrow line C-C of FIG. 2. FIG. 3 illustrates a state where an area outside an outer peripheral side surface of a gas supply pipe 20, when viewed from the direction of the arrow, is closed (blocked) by a cover 30 with hatching of a broken line.

As illustrated in FIGS. 2 and 3, the burner 2 includes the gas supply pipe 20 and the cover 30 that covers a periphery of the gas supply pipe 20.

As raw material gas, for example, octamethylcyclotetrasiloxane (OMCTS), the melting point of which is 17.5° C. and the boiling point of which is 175° C., decamethylcyclopentasiloxane (DMCPS), the melting point of which is −38° C. and the boiling point of which is 210° C., hexamethylcyclotrisiloxane, the melting point of which is 64° C. and the boiling point of which is 134° C., hexamethyldisiloxane, the melting point of which is −68° C. and the boiling point of which is 100° C., or the like can be used, and OMCTS is the most desirable.

Siloxane as raw material gas, hydrogen ($H_2$), oxygen ($O_2$), or the like as flame forming gas, nitrogen ($N_2$) as seal gas, and inert gas such as argon (Ar) or the like are supplied to the burner 2. The burner 2 sprays vaporized siloxane into an oxyhydrogen flame generated by combustion supporting gas (oxygen) and combustible gas (hydrogen), thereby causing oxidation reaction to make the glass fine particle m.

The gas supply pipe 20 is a portion forming a main body of the burner 2, and is formed in, for example, a cylindrical shape. The gas supply pipe 20 is made of a metal material, for example, stainless steel or the like having excellent corrosion resistance. A length L of the gas supply pipe 20 in an axial direction (a left and right direction) is, for example, about 75 to 105 mm. The length L of the gas supply pipe 20 can be changed, for example, depending on an amount of siloxane to be supplied in order to secure heat capacity of the gas supply pipe 20.

On the side surface of the gas supply pipe 20, connection portions 21a to 21d to which the pipes for supplying oxyhydrogen gas and seal gas are connected are provided. For example, a pipe 22a for supplying seal gas is connected to the connection portion 21a. For example, a pipe 22b for supplying hydrogen gas is connected to the connection portion 21b. For example, pipes 22c and 22d for supplying oxygen gas are connected to the connection portions 21c and 21d. For example, each of the connection portions 21a to 21d is formed to extend vertically from a side surface of the gas supply pipe 20 and then extend a connection port to which each of the pipes 22a to 22d is connected toward a back surface direction of the gas supply pipe 20.

The burner 2 includes a raw material gas port 23 for spraying siloxane which is raw material gas at a center thereof. A plurality of seal gas ports 24 for spraying $N_2$ which is seal gas are concentrically disposed around a periphery of the raw material gas port 23. A plurality of combustible gas ports 25 for spraying $H_2$ which is combustible gas are concentrically disposed around a periphery of the seal gas port 24. A plurality of combustion supporting gas ports 26 and 27 for spraying $O_2$ which is combustion supporting gas are disposed in a double concentric circle around a peripheral of the combustible gas port 25. A diameter of the raw material gas port 23 is, for example, about 1 mm or more and 4 mm or less. Diameters of the seal gas port 24, the combustible gas port 25, and the combustion supporting gas ports 26 and 27 are, for example, about 1 mm or more and 2 mm or less.

The seal gas port 24 is connected to the pipe 22a via the connection portion 21a. The combustible gas port 25 is connected to the pipe 22b via the connection portion 21b. The combustion supporting gas port 26 is connected to the pipe 22c via the connection portion 21c. The combustion supporting gas port 27 is connected to the pipe 22d via the connection portion 21d. The raw material gas port 23 is connected to a pipe 22e for supplying siloxane connected to the back surface of the gas supply pipe 20. Diameters of the pipes 22a to 22d are about ¼ to ⅜ inch. A diameter of the pipe 22e is about ¼ inch.

For example, the cover 30 is formed in a cylindrical shape having a given constant outer diameter. The cover 30 is provided to cover an outer periphery of the gas supply pipe 20 and the connection portions 21a to 21d with a predetermined length in a length direction (the left and right direction) of the gas supply pipe 20. For example, the cover 30 is formed to have a length equal to or longer than at least a distance at which the burner 2 moves (is retracted) with respect to the starting rod 110.

The cover 30 is formed to be integrated with the gas supply pipe 20. The cover 30 and the gas supply pipe 20 move together when the burner 2 moves. A back surface side of the cover 30 formed in the cylindrical shape is in an open state. On the other hand, on a front surface side of the cover 30, an area excluding the front surface of the gas supply pipe 20 housed in the cover 30, that is, an area outside the outer peripheral side surface of the gas supply pipe 20 is in a state of being closed (blocked). Therefore, when the burner 2 is observed from a front side, only the front surface of the gas supply pipe 20 is configured to be seen. The clean air sent from the clean air supply portion 8 into the clean air chamber 100B can flow into the cover 30 from the back surface side of the cover 30, and the clean air flowing into the cover 30 is prevented from flowing out of the cover 30 from the front surface side of the cover 30.

An outer diameter R2 of the cover 30 is formed to be smaller than a diameter R1 of the through hole 61 of the wall portion 6, for example, by about 10 mm. Therefore, a gap S is provided between an outer peripheral surface of the cover 30 and an inner peripheral surface of the through hole 61 of the wall portion 6. The burner 2 is inserted into a central portion of the through hole 61 so that a distance in a radial direction of the gap S is equal over the whole periphery of the cover 30 in the through hole 61 of the wall portion 6.

A heater (not illustrated), which is a heating element, is provided on an outer peripheral portion of the gas supply pipe 20 in order to keep the temperature of the gas supply pipe 20 at a high temperature. As the heater, for example, a tape heater is used. When the heater is energized, the gas supply pipe 20 is heated to reach, for example, boiling point temperature of siloxane or higher (when siloxane is OMCTS, the gas supply pipe 20 is heated to, for example, 230° C. or higher). As a result, the siloxane in the pipe 22e is heated to reach the boiling point temperature or higher, and the temperature of the siloxane is maintained so that the siloxane does not liquefy in the pipe 22e.

Next, a method for producing the glass fine particle deposited body using the producing device 1 will be described. In the method for producing the glass fine particle deposited body described below, OMCTS is used as siloxane of the raw material.

First, each burner 2 is moved by the moving mechanism 7 so that each burner 2 inserted through the through hole 61 moves up to a predetermined position at the time of starting producing with respect to the starting rod 110.

After that, clean air is supplied from the clean air supply portion 8 into the clean air chamber 100B. The clean air supplied into the clean air chamber 100B is introduced into the reaction vessel 100 through the gap S between the outer peripheral surface of the cover 30 of the burner 2 and the inner peripheral surface of the through hole 61 of the wall portion 6. Since the gap S is formed so that a cross-sectional area perpendicular to the axial direction of the burner 2 is a given constant area, the clean air is uniformly introduced into the reaction vessel 100 from the gap S during the producing process.

The gas supply pipe 20 is heated to 230° C. or higher by the heater provided on the outer peripheral portion of the gas supply pipe 20. The burner 2 sprays flame forming gas, seal gas, raw material gas, or the like. As a result, the raw material gas vaporized in the formed flame causes oxidation reaction to make the glass fine particle m. The glass fine particle m is sprayed on the starting rod 110 and deposited on the surface of the starting rod 110 and the glass fine particle deposited body M grows.

As the glass fine particle deposited body M grows and a diameter thereof increases, each burner 2 is retracted in the direction of the arrow A in FIG. 1 while keeping the cross-sectional area of the gap S between the outer peripheral surface of the cover 30 and the inner peripheral surface of the through hole 61 a given constant area.

According to the burner 2 for producing the glass fine particle deposited body, the device 1 for producing the glass fine particle deposited body, and the method therefor as described above, the gas supply pipe 20 and the connection portions 21a to 21d of the pipes 22a to 22d are covered with the cover 30 having the given constant outer diameter R2. Therefore, when the burner 2 inserted through the through hole 61 of the wall portion 6 is moved (retracted) along the through hole 61, the burner 2 can be retracted so that the cross-sectional area of the gap S between the outer peripheral surface of the cover 30 of the burner 2 and the inner peripheral surface of the through hole 61 becomes a given constant area. As a result, an air flow of the clean air flowing from the clean air chamber 100B into the reaction vessel 100 through the gap S can be uniform. Therefore, during the producing process, the temperature of the deposition surface of the glass fine particle deposited body M can be stabilized, and the glass fine particle m can be efficiently deposited thereon. Exhaust can be efficiently performed from the exhaust pipe 101 of the reaction vessel 100, and the excess glass fine particle m in the reaction vessel 100 can be removed.

When the raw material gas is OMCTS, the gas supply pipe 20 is heated to 230° C. or higher during the deposition of the glass fine particle deposited body M, thereby it is possible to prevent OMCTS from liquefying in the gas supply pipe 20, that is, in the pipe 22e.

In the above-described embodiment, the cover 30 is fixed to the gas supply pipe 20, but the present invention is not limited thereto. The cover 30 may be fixed to, for example, a bracket provided in the moving mechanism 7 to support the gas supply pipe 20. In the above-described embodiment, the MMD method is described as an example, but the present invention is not limited thereto. For example, the present invention can also be applied to an OVD method in which the glass fine particle is deposited in the same manner as that of the MMD method.

Hereinabove, while the present invention has been described in detail and with reference to specific embodiments, it is apparent to those skilled in the art that various modifications and corrections can be made without departing from the spirit and scope of the present invention. The number, position, shape, or the like of the above-described components are not limited to the embodiments, and can be changed to the number, position, shape, or the like suitable for performing the present invention.

The phrase that the outer diameter of the cover has a given constant length does not indicate that the outer diameter thereof is strictly constant, and indicates that the outer diameter thereof may have a range in which the effect of the present invention is exhibited.

REFERENCE SIGNS LIST

1: producing device
2: burner
6: wall portion
7: moving mechanism
8: clean air supply portion
20: gas supply pipe
21a to 21d: connection portion
22a to 22e: pipe
23: raw material gas port
24: seal gas port
25: combustible gas port
26, 27: combustion supporting gas port
30: cover
61: through hole
81: air supply pipe
100: reaction vessel
100A: reaction chamber
100B: clean air chamber
101: exhaust pipe
110: starting rod
m: glass fine particle
M: glass fine particle deposited body
S: gap

The invention claimed is:
1. A method for producing a glass fine particle deposited body, which produces the glass fine particle deposited body by depositing a glass fine particle on a starting rod disposed inside a reaction vessel, the method comprising:
    providing a through hole through which a burner passes on a wall surface of a wall portion disposed to be separated from the starting rod, the burner being provided with metallic gas supply pipes as a main body of the burner and a cover that covers the metallic gas supply pipes in an integrated manner, a pipe for supplying raw material gas, a pipe for supplying oxyhydrogen gas, and a pipe for supplying seal gas are connected to a respective metallic gas supply pipe of the metallic gas supply pipes, the cover covering an entire length of the metallic gas supply pipes and a connection portion of the metallic gas supply pipes connected to a side surface of the metallic gas supply pipes with a predetermined length in an axial direction of the burner and a given constant outer diameter;
    retracting the burner while keeping a gap with the through hole a given constant length as the glass fine particle deposited body grows; and
    introducing clean air into the reaction vessel through the gap,
    wherein octamethylcyclotetrasiloxane (OMCTS) is used as a raw material and the metallic gas supply pipes are heated to 230° C. or higher.

* * * * *